United States Patent
Schunck

[11] Patent Number: 6,058,705
[45] Date of Patent: May 9, 2000

[54] HYDRAULIC BRAKE SYSTEM

[75] Inventor: Eberhardt Schunck, Landau, Germany

[73] Assignee: Robert Bosch GmbH, Stuttgart, Germany

[21] Appl. No.: 08/988,176

[22] Filed: Dec. 10, 1997

[30] Foreign Application Priority Data

Dec. 10, 1996 [DE] Germany .......................... 196 51 153

[51] Int. Cl.$^7$ ................................................ B60T 11/20
[52] U.S. Cl. .................................. 60/562; 60/582; 60/592
[58] Field of Search .................................. 60/533, 547.1, 60/562, 582, 589, 592

[56] References Cited

U.S. PATENT DOCUMENTS

| | | | |
|---|---|---|---|
| 4,490,977 | 1/1985 | Fulmer | 60/582 |
| 4,724,674 | 2/1988 | Fulmer | 60/582 X |
| 5,031,968 | 7/1991 | Takata | 60/582 X |
| 5,036,665 | 8/1991 | Brown, Jr. | 60/582 X |
| 5,161,375 | 11/1992 | Crumb et al. | 60/589 X |
| 5,332,302 | 7/1994 | Maas | 60/582 X |

FOREIGN PATENT DOCUMENTS 43 43 386 A 1  6/1995  Germany .
43 22 182 A 1  12/1995  Germany .

OTHER PUBLICATIONS

Bosch Technische Berichte, 1986/87, pp. 243/244/145.

SAE/Electrohydraulic Brake System—The First Approach to Brake-By-Wire Technology pp. 107/108 and 112, Aug. 1996.

*Primary Examiner*—Hoang Nguyen
*Attorney, Agent, or Firm*—Edwin E. Greigg; Ronald E. Greigg

[57] ABSTRACT

The invention relates to a hydraulic brake system having a tandem master cylinder as the brake force set-point value transducer for braking by external force, downstream of which are disconnection valves for hydraulically disconnecting the master cylinder from wheel brake cylinders for external force braking. To achieve a pedal travel when the disconnection valves are closed, the invention proposes a lengthened idle travel of the pistons of the master cylinder, for instance by increasing a valve opening stroke of central valves integrated with the pistons. A travel-dependent pedal force is realized with simulator spring elements that act upon the pistons.

20 Claims, 2 Drawing Sheets

HYDRAULIC BRAKE SYSTEM

BACKGROUND OF THE INVENTION

The invention relates to a hydraulic brake system which is normally actuatable by means of an external force but in an emergency is actuatable by muscle power.

One such brake system is known from German Patent Disclosure DE 43 22 182 Al. The known brake system has an external energy source in the form of a hydraulic pump, which is drivable by an electric pump motor and pumps into a hydraulic pressure reservoir that contains brake fluid under pressure for braking. Connected to the hydraulic reservoir are wheel brake cylinders, and a wheel brake pressure in the wheel brake cylinders can be adjusted by means of wheel brake pressure control valve assemblies. These wheel brake pressure control valve assemblies typically have one brake pressure buildup valve and one brake pressure reducing valve for each wheel brake cylinder, or these two valves per wheel brake cylinder can be combined into a single valve.

As a brake force set-point value transducer for braking operation using an external force, the known brake system has a brake pedal and a conventional master cylinder, which for external force braking can be disconnected from the wheel brake cylinders by means of a downstream disconnection valve. The wheel brake pressures are adjusted as a function of a brake pedal travel or the actuation force for the brake pedal or the master cylinder pressure generated; different pressures can be established in the wheel brake cylinders in the front and rear, and in the case of brake slip control on the right and left as well.

The master cylinder of the known brake system is preferably a tandem master cylinder, of whose two positive displacement chambers at least one is assigned to front-wheel brake cylinders. If the external energy should fail, emergency braking by muscle power can be executed.

The positive displacement chambers of the tandem master cylinder are embodied with a closed disconnection valve in order to achieve piston travel upon external force braking: Brake fluid contained in one of the positive displacement chambers is positively displaced from it, by actuation of the master cylinder, into a brake fluid supply container, so that piston strokes are possible with the disconnection valve closed. A simulator spring inserted into one of the positive displacement chambers exerts forces on the pistons that increase linearly with the piston travel distances, so that a driver must exert a greater actuating force for a longer brake pedal travel. The increase may be linear by means of a linear simulator spring, or progressive.

OBJECT AND SUMMARY OF THE INVENTION

The hydraulic external-force brake system according to the invention has a master cylinder with a lengthened idle travel of 10 mm, for instance, so that the piston must first be displaced into the master cylinder by the idle travel distance, before a pressure can be built up in the master cylinder. The idle travel enables a motion of the piston during the external force braking event, in which because of the closed disconnection valve no brake fluid can be positively displaced out of the master cylinder into the wheel brake cylinders. Even during the idle travel, the wheel brake cylinders are acted upon by pressure from the external energy source, so that no brake pedal travel is lost for the external force braking event. A simulator spring element that presses the piston in the direction of its basic position brings about a desired piston force upon brake actuation. Once the idle travel has been traversed, the respective piston builds up a pressure in the positive displacement chambers.

It is an advantage of the brake system of the invention that it can be realized by means of only slight changes in an existing master cylinder, namely by installing the harder simulator spring element instead of a piston restoring spring and by adjusting a longer valve opening stroke of a central valve integrated with the piston, for instance by using a longer valve tappet or by means of a greater spacing of the poppet bore from a sealing cuff of the piston of the master cylinder, for instance by shifting the sealing cuff along the piston. Otherwise, no modifications whatever of an existing master cylinder are necessary. The brake system according to the invention can therefore be realized economically, and an existing external-force brake system can be retrofitted at little effort or expense to make the brake system of the invention with the option of braking by muscle power.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
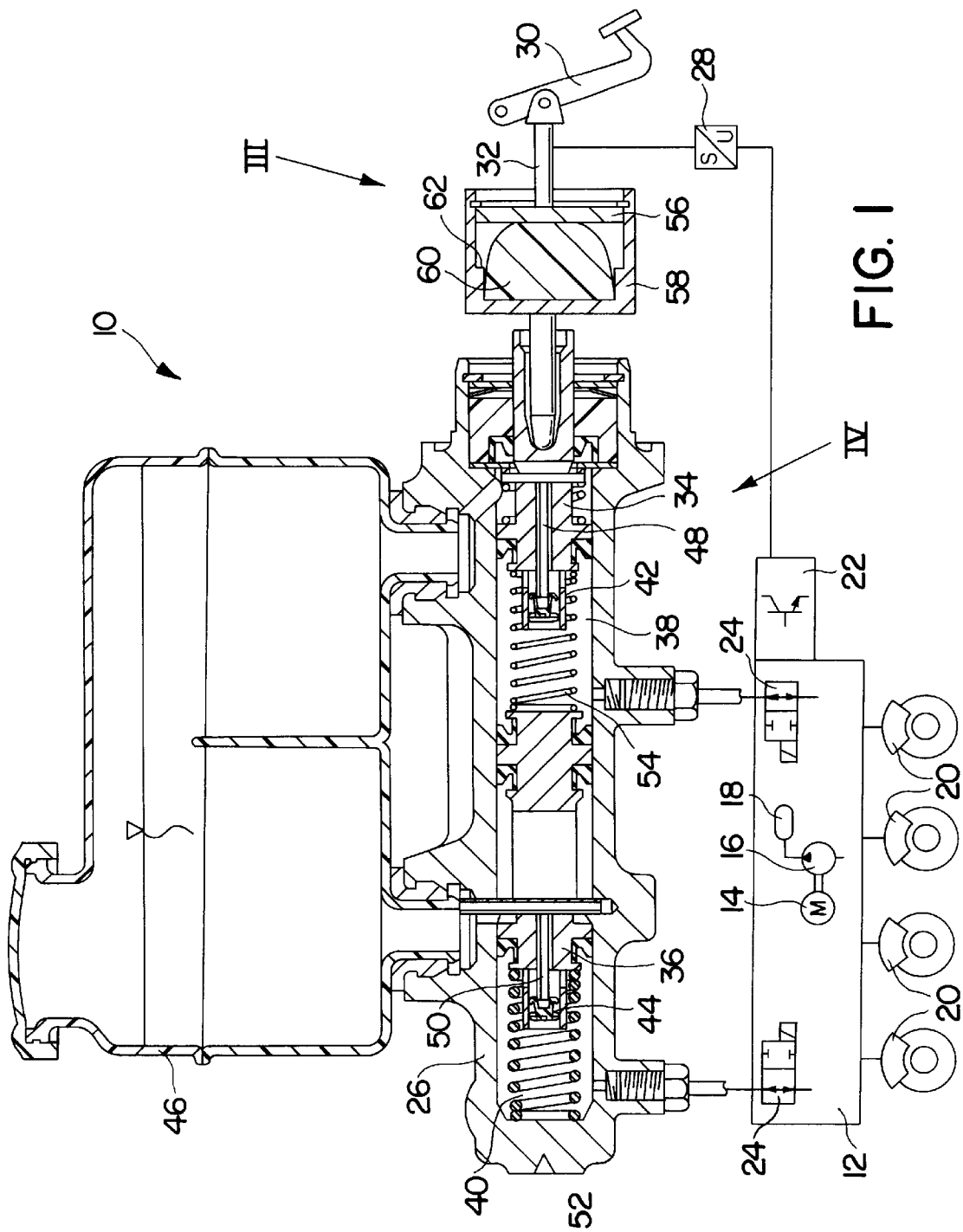
FIG. 1 shows a hydraulic external-force brake system according to the invention.

The hydraulic brake system of the invention, shown in FIG. 1 and identified overall by reference numeral 10, has a brake assembly 12 with an external energy source that has a pump drive motor 14 and a hydraulic pump 16, with which a hydraulic reservoir 18 can be filled with brake fluid under pressure. The brake fluid under pressure in the hydraulic reservoir 18 is used to actuate wheel brake cylinders 20: a wheel brake pressure can be adjusted specifically for an individual wheel with individual wheel brake pressure control valve assemblies, not shown, which in a manner known per se have one pressure buildup and one pressure reducing valve, for instance, for each wheel brake cylinder 20. Such external force brake assemblies 12 are known per se from the prior art. For controlling the wheel brake pressure control valve assemblies and the pump motor 14, the brake assembly 12 has an electronic control unit 20. The brake assembly 12 may have an anti-lock or slip control system, known per se.

Hydraulically, the two front axle brake circuits, for instance, of the brake system are connected to a tandem master cylinder 26 via disconnection valves 24. The disconnection valves 24 are 2/2-way magnet valves that are open in their basic position and are controlled to their closing position during an external force braking event, so that the master cylinder 26 is hydraulically disconnected from the brake assembly 12.

The master cylinder 26 acts as a brake force set-point value transducer. It has a travel sensor 28, with which a motion of a brake pedal 30 on a pedal rod 32 is picked up, converted into an electrical signal, and delivered to the electronic control unit 22, which adjusts a wheel brake pressure in the wheel brake cylinders 20 that is dependent on the travel, or distance by which the brake pedal is depressed;

the wheel brake pressure is adjustable individually in each wheel brake cylinder 20. Instead of the travel sensor 28 or in addition to it, a force-measuring cell, not shown, can be used, which measures the force with which the brake pedal 30 is depressed.

The master cylinder 26 has two pistons, namely a rod piston 34 that can be mechanically pressed into the master cylinder 26 by means of the brake pedal 30 via the pedal rod 32, and a floating piston 36, which is driven by the pressure built up in the master cylinder 26 by the rod piston 34. Each piston 34, 36 is assigned a respective positive displacement chamber 38, 40.

The two pistons 34, 36 each have an integrated central valve 42, 44, which in the basic position of the pistons 34, 36 shown in the drawing is open, so that the positive displacement chambers 38, 40 communicate with a brake fluid supply container 46 mounted on the master cylinder 26. Tappets 48, 50 of the central valves 42, 44 are embodied as long enough to produce a valve opening stroke approximately 5 mm long; that is, the valve opening stroke of the central valves 42, 44 is lengthened by a multiple factor, compared with known master cylinders in which the valve opening stroke of the central valves is approximately 0.5 to 1 mm long. Since the central valves 42, 44 do not close until the pistons 34, 36 have been displaced inward into the master cylinder 26 by the respective valve opening stroke, an idle travel of the pistons 34, 36 that is the length of the valve opening stroke is brought about.

The idle travel of each piston 34, 36 amounts to approximately 5 mm, or in other words 10 mm for the two pistons together. During the idle travel, the respective positive displacement chamber 38, 40 communicates through the opened central valve 42, 44 with the brake fluid supply container 46, and therefore no pressure is built up in the positive displacement chambers 38, 40. Not until the piston 34, 36 has executed its idle travel does its central valve 42, 44 close, and by forcing the piston 34, 36 farther into the master cylinder 26, a pressure is built up in the positive displacement chamber 38, 40 assigned to it. This idle travel of the two pistons 34, 36, of about 10 mm together in the exemplary embodiment, makes it possible in the external force braking event, during which the disconnection valves 24 are closed and thus no brake fluid can be positively displaced out of the positive displacement chambers 38, 40 into the wheel brake cylinders 20, to depress the brake pedal 30 and as a result, particularly when the travel sensor 28 is used, to execute an external force braking event.

Helical compression springs 52, 54 are installed as simulator spring elements in the master cylinder 26; they press the pistons 34, 36 into their basic position. A helical compression spring 52 acting upon the floating piston 36 is braced against a closed face end of the master cylinder 26. A helical compression spring 54 acting upon the rod piston 34 is braced against the floating piston 36. These two helical compression springs 52, 54, acting as simulator spring elements, require a force for depressing the brake pedal 30 of a magnitude known from muscle-powered, or brake-boosted, brake systems in order to lend the driver a familiar braking feel as the pedal force rises to depress the brake pedal 30.

Instead of the tandem master cylinder 26 shown, with central valves 42, 44 in its pistons 34, 36, a tandem master cylinder of a type known per se with poppet bores, not shown, may also be used, through which bores the positive displacement chambers 38, 40, in the basic position of the pistons 34, 36, communicate with the brake fluid supply container 46 and which are overtaken by the pistons as the pistons are pressed into the master cylinder, so that the positive displacement chambers are disconnected from the brake fluid supply container, and pressure can be built up in the positive displacement chambers. Here, the idle travel of the pistons according to the invention is attained in that a spacing of the poppet bores from piston seals is increased in the displacement direction of the pistons. For a given master cylinder, this can easily be attained by providing that the piston seals are mounted on the piston at a place shifted by the length of the desired idle travel.

A travel/force dependency upon depression of a brake pedal is typically not linear but rather progressive; that is, the force required to depress the brake pedal increases this disproportionately with an increasing pedal travel. There is a metering range for low to medium vehicle deceleration, in which the pedal force on depression of the brake pedal rises only slightly, so that the braking force can be well metered. The metering range encompasses braking events typically performed in traffic. The metering range is adjoined by a progressive range for high vehicle decelerations, in which a brake pedal must be depressed increasingly more strongly in order to attain a longer pedal travel and thus a higher braking force. A driver is given the feel of an increasing "hardening" at the brake pedal upon depressing it. The progressive range changes over to a terminal range upon a full braking, in which essentially only the pedal force and thus the braking force rise, while conversely the brake pedal hardly moves further.

To achieve a progressive increase in the force at the brake pedal 30, the helical compression springs 52, 54 that form the simulator spring elements may have a progressive spring characteristic curve; that is, upon compression the spring force increases disproportionately. A progressive spring characteristic curve can be attained by means of turn spacings that decrease toward one end of the helical compression spring 52, 54. Moreover, a progression can be attained by using two helical compression springs 52, 54 of different hardness, especially if the harder helical compression spring, in the exemplary embodiment shown, the helical compression spring 52 on the left in the drawing and acting upon the floating piston 36, is built in with prestressing, or with greater prestressing than the other helical compression spring 54. In the exemplary embodiment, the prestressing force of the harder helical compression spring 52 is nearly as great as the spring force of the less-hard helical compression spring 52 when the latter has been compressed by the idle travel of its piston 34. As a result, upon depression of the brake pedal 30, initially only the rod piston 34 is displaced, counter to the force of the helical compression spring 54 acting on it. Shortly before the end of the idle travel of the rod piston 34, the floating piston 36 also begins to move, counter to the force of the helical compression spring 52 acting upon it.

As soon as the rod piston 34 has traversed its idle travel, its central valve 42 closes, and since the disconnection valves 24 for the external force braking event are closed, no brake fluid can be positively displaced out of the positive displacement chamber 38 associated with the rod piston 34. The brake fluid trapped in the positive displacement chamber 38, and which can be considered incompressible, has the effect that upon further depression of the brake pedal 30 the floating piston 30 moves along with the rod piston 34, so that now only the harder helical compression spring 52 is compressed. This results in a progression of the force required to depress the brake pedal 30. The course F of the brake pedal force in the metering range is schematically shown in FIG.

2 as a function of the idle stroke $s_1$, $s_2$ of the rod piston and the floating piston 34, 36, which are proportional to the brake pedal travel.

Once the pistons 34, 36 have covered their idle travel, no further brake fluid can be displaced from the positive displacement chambers 38, 40 because of the closed disconnection valves 24 during the external force braking event; the pistons 34, 36 cannot be displaced any deeper into the master cylinder 26. To release a longer pedal travel here, the brake system 10 of the invention has a third elasticity, which may be integrated into the pedal rod 32 that connects the brake pedal 30 to the rod piston 34: This third elasticity can be effected for instance by means of a gas compression spring element, whose principle is disclosed in German Patent Disclosure DE 43 24 041 A. In the exemplary embodiment, the third elasticity has a piston 56, which is connected to the brake pedal 30 and is displaceable in a cylinder 58 connected to the rod piston 34. As the simulator spring element, a dome-like elastomer body 60 with closed pores, for instance of polyurethane, is inserted into the cylinder 58. Because of its material properties, this elastomer body 60 already has a progressive elasticity behavior. This progressive behavior is reinforced by the dome shape, since the elastomer body 60 upon compression presses, over an increasing portion of its height, against a circumferential wall of the cylinder 58 and as a consequence cannot stretch farther in the radial direction.

Figure 2:
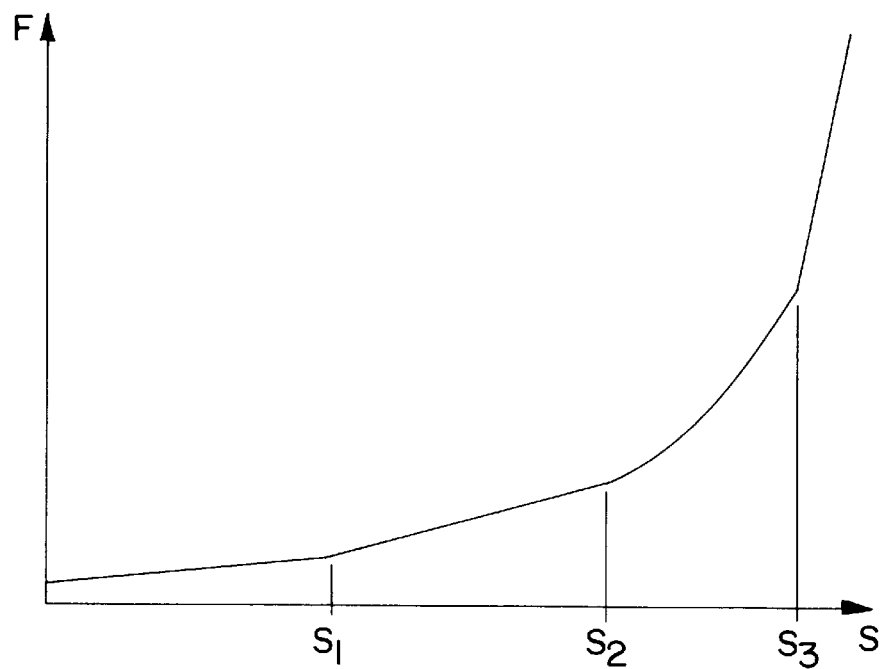
FIG. 2 schematically shows an actuation travel/force graph for the brake system of FIG. 1.

The elastomer body 60 is inserted into the cylinder 58 with initial tension, and the initial tension is selected to be so great that the elastomer body 60 does not deform until the floating piston 36, acted upon by the stronger helical compression spring 52, has traversed nearly its entire idle travel. In this way, following the metering region, after the idle travels $S_1$, $S_2$ have been overcome, the brake pedal force rises in the progressive region up to $s_3$ highly progressively, as schematically indicated in FIG. 2. This progressive region up to $S_3$ is limited by a stop 62 in the cylinder 58, which limits the displacement travel of the piston 56. As soon as the piston 56 reaches the stop 62, the brake pedal 30 becomes virtually rigid; it can now be depressed only slightly, while conversely the pedal force increases sharply (terminal region to the right of s^Y3^Y in FIG. 2).

Figure 3:
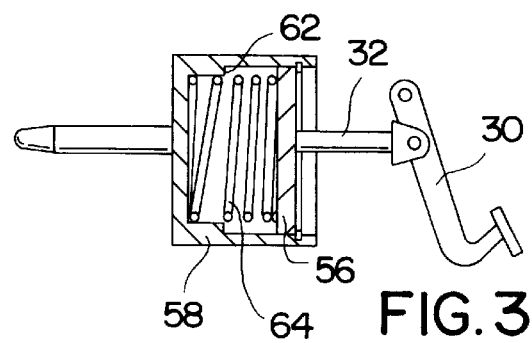
FIG. 3 shows a detail of a modified embodiment of the invention indicated by the arrow III in FIG. 1.

Instead of the elastomer body 60, a helical compression spring 64 with a linear or progressive spring characteristic curve can for instance be inserted as a simulator spring element into the piston-cylinder unit 56, 58, as shown in FIG. 3.

Figure 4:
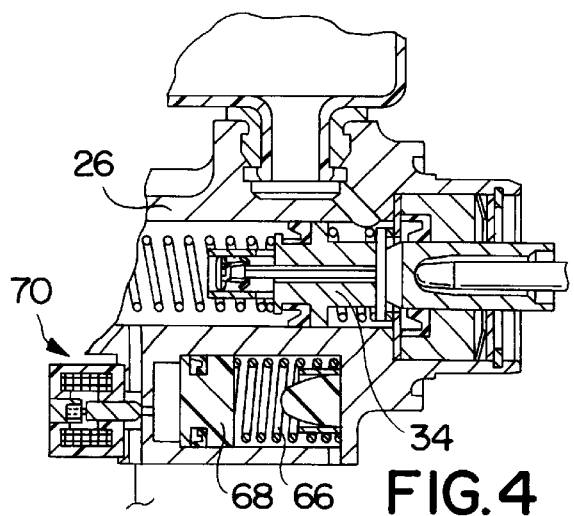
FIG. 4 shows a detail of a further modified embodiment of the invention indicated by the arrow IV in FIG. 1.

The third elasticity can also be realized hydraulically by an elasticity in one of the master cylinder circuits, as shown in FIG. 4. In a known manner, a simulator piston 68 loaded by a simulator spring 66 is acted upon by brake fluid at master cylinder pressure. When the central valves 42, 44 are closed, a further motion of the piston 34 of the master cylinder 26 is thus possible, as long as the simulator piston 68 is yielding. The simulator piston 68 can be blocked off in the emergency braking instance by means of an additional valve 70. The additional valve 70 may be actuated electromagnetically or mechanically by the motion of the master cylinder piston 36.

If the external energy source 14, 16, 18, 22 should fail, the disconnection valves 24 remain open when the brake pedal 30 is depressed, and a muscle-powered braking by means of the master cylinder 26 is effected in a manner known per se.

The foregoing relates to preferred exemplary embodiments of the invention, it being understood that other variants and embodiments thereof are possible within the spirit and scope of the invention, the latter being defined by the appended claims.

I claim:

1. A hydraulic brake system, comprising a master cylinder actuatable by muscle power, as a brake force set-point value transducer for external force braking events, a disconnection valve, downstream of the master cylinder, said disconnection valve disconnects the master cylinder from wheel brake cylinders during an external force braking event, an external energy source, intended for external force braking events, to which the wheel brake cylinders comprising the wheel brake pressure control valve assemblies are connected, wherein the wheel brake cylinders in the event of a failure of the external energy source can be acted upon with braking pressure by means of the master cylinder, a simulator spring element, said simulator spring element forces a piston of the master cylinder into its basic position and brings about a travel/force dependency at the piston that is similar to that of muscle-powered or power-assisted brake systems, the piston (34, 36) of the master cylinder (26) has a lengthened idle travel, and the piston (34, 36) builds up no pressure in the master cylinder while the piston is traversing the idle travel, and an external force braking event takes place while the piston (34, 36) executes the idle travel.

2. A hydraulic brake system in accordance with claim 1, in which the total idle travel of the piston (34, 36) is approximately 10 mm long.

3. A hydraulic brake system in accordance with claim 1, in which the total idle travel of the piston (34, 36) is approximately one-third to two-thirds the length of a total stroke of the piston (34, 36).

4. A hydraulic brake system in accordance with claim 1, in which the piston (34, 36) of the master cylinder (26) has a central valve (42, 44), which is open in a basic position of the piston (34, 36) and through which a positive displacement chamber (38, 40) of the master cylinder (26) communicates with a brake fluid supply container (46), and a valve opening stroke of the central valve (42, 44) is lengthened in order to represent the lengthened idle travel of the piston.

5. A hydraulic brake system in accordance with claim 2, in which the piston (34, 36) of the master cylinder (26) has a central valve (42, 44), which is open in a basic position of the piston (34, 36) and through which a positive displacement chamber (38, 40) of the master cylinder (26) communicates with a brake fluid supply container (46), and a valve opening stroke of the central valve (42, 44) is lengthened in order to represent the lengthened idle travel of the piston.

6. A hydraulic brake system in accordance with claim 3, in which the piston (34, 36) of the master cylinder (26) has a central valve (42, 44), which is open in a basic position of the piston (34, 36) and through which a positive displacement chamber (38, 40) of the master cylinder (26) communicates with a brake fluid supply container (46), and a valve opening stroke of the central valve (42, 44) is lengthened in order to represent the lengthened idle travel of the piston.

7. A hydraulic brake system in accordance with claim 1, in which the master cylinder (26) has a poppet bore, through which a positive displacement chamber (38, 40) of the master cylinder (26) communicates with a brake fluid supply container (46) when the piston (34, 36) is in its basic position, and a spacing distance of the poppet bore from the piston (34, 36) in the stroke direction of the piston (34, 36) is increased to represent the lengthened idle travel of the piston.

8. A hydraulic brake system in accordance with claim 2, in which the master cylinder (26) has a poppet bore, through which a positive displacement chamber (38, 40) of the master cylinder (26) communicates with a brake fluid supply container (46) when the piston (34, 36) is in its basic position, and a spacing distance of the poppet bore from the piston (34, 36) in the stroke direction of the piston (34, 36) is increased to represent the lengthened idle travel of the piston.

9. A hydraulic brake system in accordance with claim 3, in which the master cylinder (26) has a poppet bore, through which a positive displacement chamber (38, 40) of the master cylinder (26) communicates with a brake fluid supply container (46) when the piston (34, 36) is in its basic position, and a spacing distance of the poppet bore from the piston (34, 36) in the stroke direction of the piston (34, 36) is increased to represent the lengthened idle travel of the piston.

10. A hydraulic brake system in accordance with claim 1, in which the brake system (10) is embodied as a dual-circuit brake system with a tandem master cylinder (26), and the master cylinder (26) has true simulator spring elements (52, 54) one for each piston (34, 36).

11. A hydraulic brake system in accordance with claim 1, in which the simulator spring element (52, 54) has a progressive spring characteristic curve.

12. A hydraulic brake system in accordance with claim 10, in which the two simulator spring elements (52, 54) have different spring hardnesses.

13. A hydraulic brake system in accordance with claim 10, in which one of the simulator spring elements (52) has a prestressing force or a greater prestressing force than the other simulator spring element (54).

14. A hydraulic brake system in accordance with claim 1, in which the master cylinder (26) has a further simulator spring element (60), by way of which a piston (34) of the master cylinder (26) can be acted upon by a force for brake actuation.

15. A hydraulic brake system in accordance with claim 14, in which the further simulator spring element (60) has an elastomer.

16. A hydraulic brake system in accordance with claim 14, in which the further simulator spring element has a steel spring (64).

17. A hydraulic brake system in accordance with claim 15, in which the further simulator spring element has a steel spring with a progressive spring characteristic curve.

18. A hydraulic brake system in accordance with claim 14, in which the further simulator spring element allows a short brake pedal travel before the force necessary to displace the piston (34) of the master cylinder (26) is attained.

19. A hydraulic brake system in accordance with claim 1, in which between one of the positive displacement chambers (38, 40) of the master cylinder (26) and the associated disconnection valve (24), the master cylinder has a hydraulic elasticity (66, 68), in a further circuit which after the closure of the central valves (42, 44) allows a further piston travel with an increasing actuation force.

20. A hydraulic brake system in accordance with claim 19, in which the additional hydraulic elasticity (66, 68) is blocked off in the emergency braking instance by means of an additional valve (70).

* * * * *